UNITED STATES PATENT OFFICE.

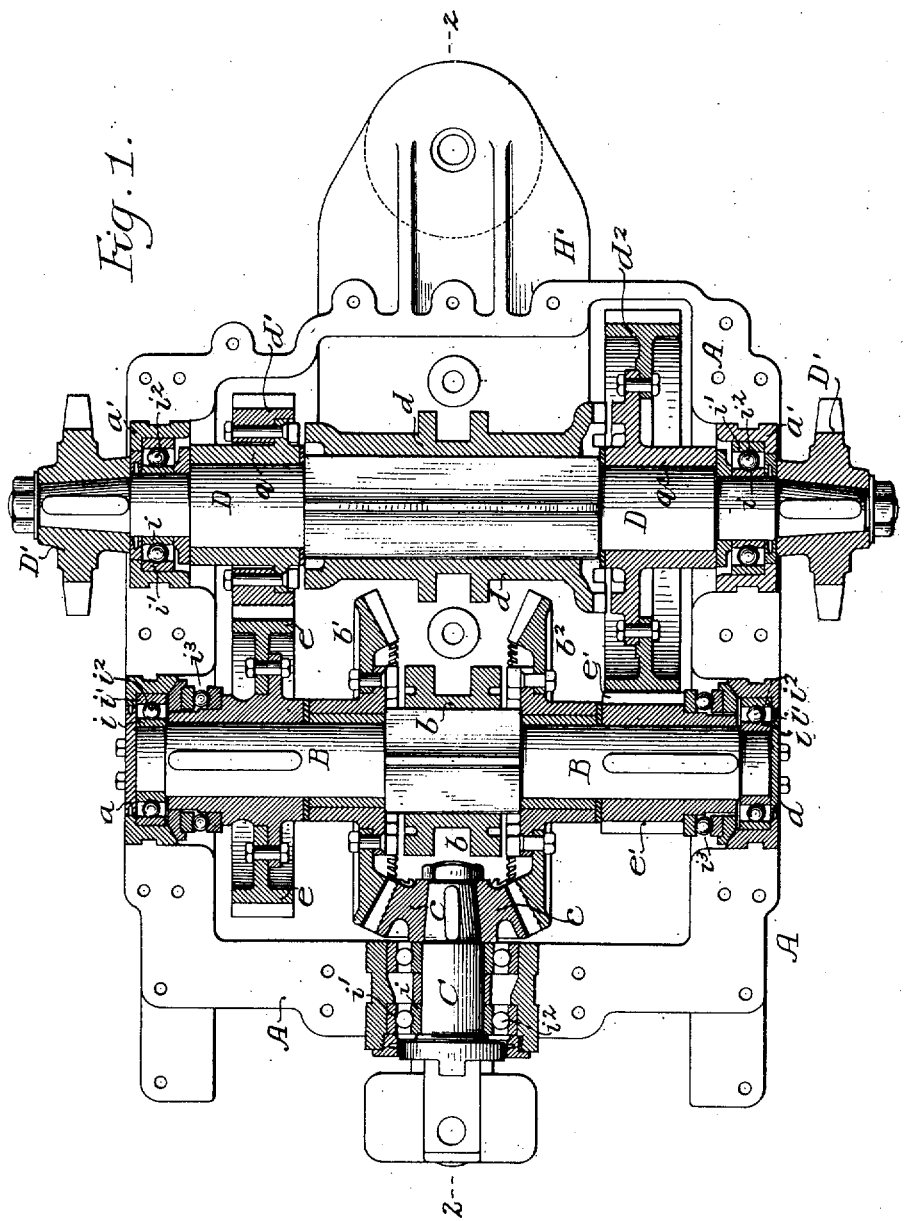

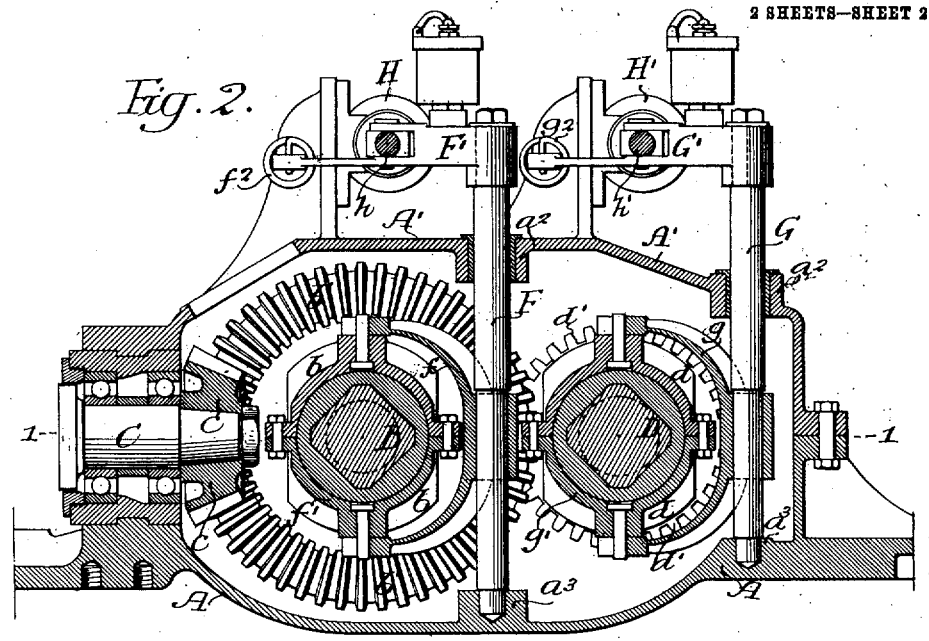

ARCHIBALD HYDE EHLE, OF PHILADELPHIA, PENNSYLVANIA.

CHANGE-GEARING.

No. 847,048.     Specification of Letters Patent.     Patented March 12, 1907.

Application filed October 16, 1906. Serial No. 339,186.

*To all whom it may concern:*

Be it known that I, ARCHIBALD HYDE EHLE, a citizen of the United States, residing in Philadelphia, Pennsylvania, have invented certain Improvements in Change-Gearing, of which the following is a specification.

The object of my invention is to improve the construction of change-gearing mounted between a driving and a driven element of a machine.

My invention is particularly adapted for use in connection with a motor-driven car-truck, such as that illustrated in my application for patent for a motor-driven truck, filed October 16, 1906, Serial No. 339,187.

In the accompanying drawings, Figure 1 is a sectional plan view on the line 1 1, Fig. 2, illustrating my improved change-gearing. Fig. 2 is a sectional elevation on the line 2 2, Fig. 1. Fig. 3 is a plan view showing the mechanism for shifting the clutches of the speed-gearing.

A is a frame having boxes $a$ $a'$ for the two shafts B and D and also bearings for the driving-shaft C. The bearings in this instance are ball-bearings, and each bearing consists of two rings $i$ $i'$, between which are mounted the balls $i^2$; but it will be understood that other types of bearing may be used without departing from the essential feature of my invention. The shaft C is connected to an engine or other motor and has a bevel-pinion $c$ mounted thereon. The shaft B has a central squared portion to receive a clutch-sleeve $b$, toothed at each end, and mounted on the cylindrical portion of the shaft on each side of the center are bevel-gear-wheels $b'$ $b^2$, which mesh with the bevel pinion $c$ on the shaft C. The inner surface of each bevel-wheel is toothed to engage the toothed end of the sleeve $b$ when the said sleeve is shifted to the right or left, so that the sleeve and shaft will be driven by the gear-wheel.

When the sleeve is in the central position, as shown in Fig. 1, the gearing is detached from the driving mechanism; but when the sleeve is shifted, so as to throw its teeth in engagement with the teeth of the bevel-wheel $b'$, then the gearing is driven in one direction. When it is shifted to gear with the teeth of the wheel $b^2$, it is turned in the opposite direction. Therefore the clutch $b$ is for the purpose of reversing the direction of movement of the shaft or throwing it out of gear entirely.

On the shaft between the bearings and the hubs of the gear-wheels $b$ $b'$ are gear-wheels $e$ $e'$, both keyed to the shaft B, the wheel $e$ being greater in diameter than the wheel $e'$. I preferably mount thrust-bearings $i^3$ of the ball type on the extended hubs of the wheels $e$ $e'$. These bearings are similar in construction to the ball-bearings $a$ $a'$. On the central squared portion of the shaft D is a clutch-sleeve $d$, and on the cylindrical portion of the shaft at each side of the squared portion are gear-wheels $d'$ $d^2$. These wheels are loose on the shaft and their teeth mesh with the wheels $e$ $e'$, respectively. The clutch-sleeve $d$ has teeth at each end which engage with teeth on the hubs of the wheels $d'$ $d^2$, so as to lock either one or the other of the wheels to the shaft.

It will be noticed in referring to the drawings that the wheel $e'$ is less in diameter than the wheel $e$ and the wheel $d'$ on the shaft D is less in diameter than the wheel $d^2$, which meshes with the small wheel $e'$. By this arrangement the speed of the shaft D can be changed by coupling one or other of the wheels $d'$ or $d^2$ to the shaft D on shifting the sleeves $d$. When it is wished to drive the shaft D at a high speed, then the clutch-sleeve $d$ is shifted so as to lock with the wheel $d'$. If a slow speed is desired, then the sleeve is shifted so as to lock with the teeth of the wheel $d^2$. This gearing is intended for very heavy work. Instead of keying the sleeves to the shafts I preferably shape the shafts so that the sleeves will be free to slide on the shafts, but must turn with them. In the present instance the central section of each shaft is squared, and the opening through each sleeve is square to fit the shaft. This makes a very substantial construction.

It will be noticed in referring to the drawings that the large gear-wheels are preferably made in sections—a hub-section and a rim-section—the two sections being bolted together; but it will be understood that each wheel may be made in a single piece without departing from my invention. The gearing is preferably inclosed by a cap A', which is bolted to the base A in any suitable manner. The cap in the present instance forms with the base a means for clamping the bearing-boxes in position. By using a construction of this type the gearing may work in oil, if desired, as the lower portion of the casing is tight, so as to hold a quantity of oil or other lubricant.

In order to properly shift the two sleeves $b$ and $d$, I mount two spindles F and G in bearings in the box, the spindles passing through bearings $a^2$ in the cover A' and in step-bearings $a^3$ in the bottom of the base A, as indicated in Fig. 2, and on these spindles are forked arms $f$ and $g$, respectively, which are coupled to rings $f'$ and $g'$, mounted in the grooves in the sleeves $b$ and $d$. On the upper end of the spindle F is an arm F', held in its central position by springs $f^2$, one on each side of the arm, as clearly illustrated in Fig. 3, and connected to the arm is a rod $h$, having at each end a piston mounted in a cylinder H, the valve in this cylinder being preferably controlled by any suitable electrical device. On the end of the shaft G is an arm G', held in the central position by two springs $g^2$, similar to the arm F', and coupled to the arm is a rod $h'$, having pistons mounted in the cylinders H', one on each side of the arm, as indicated in Fig. 3, and the valves of these cylinders are preferably actuated by electrical mechanism similar to the valves of the cylinders H. One form of this mechanism is illustrated and described in my application for patent filed September 12, 1905, Serial No. 278,127. The ends of the shaft D extend beyond the frame A and have mounted on them in the present instance two sprocket-wheels D', over each of which passes a drive-chain to any mechanism which it is desired to drive. It will be understood that one sprocket-wheel may be used, or a belt-wheel may be substituted for the sprocket-wheel, or where it is desired to mount the gear on a truck, for instance, the shaft may then be a driving-axle for the truck. Thus it will be seen that by shifting the clutch-sleeve $b$ the direction of movement of the shaft D can be reversed at will, or the mechanism can be thrown out of gear entirely, and by shifting the clutch-sleeve $d$ the speed can be changed. Thus I am enabled to make a very simple and powerful change-gear which is especially applicable for use in transmitting power from an engine to the driving-wheels of a motor-driven railway-car truck.

I claim—

1. The combination of a frame, an intermediate shaft and a driving-shaft arranged parallel with each other and mounted in bearings in the said frame, a driving-shaft arranged at right angles to said shafts and in a central position in respect thereto, a bevel-pinion mounted on the said shaft, the intermediate shaft having a squared portion, a sleeve mounted on the squared portion so as to slide on but turn with the shaft and having teeth at each end, bevel-wheels mounted on the cylindrical portions of the shafts, one on each side of the squared portion and meshing with the bevel-pinions of the driving-shaft, said wheels having teeth on their faces arranged to engage the teeth of the clutch-sleeve, gear-wheels of different diameters, one secured to one end of the intermediate shaft and the other secured to the opposite end of the intermediate shaft between the bevel-wheels and the bearings, a driven shaft having a central squared portion, a long sleeve mounted on the squared portion having teeth at each end, gear-wheels loosely mounted on the cylindrical portions of the said shaft on each side of the squared portion, said wheels differing in diameter so as to mesh with the wheels on the intermediate shaft, and means for shifting the two sleeves, substantially as described.

2. The combination of a frame, an intermediate shaft and a driving-shaft arranged parallel with each other and mounted in bearings in the said frame, a driving-shaft arranged at right angles to said shafts and in a central position in respect thereto, a bevel-pinion mounted on the said shaft, the intermediate shaft having a squared portion, a sleeve mounted on the squared portion so as to slide on but turn with the shaft and having teeth at each edge, bevel-wheels mounted on the cylindrical portions of the shafts, one on each side of the squared portion and meshing with the bevel-pinions of the driving-shaft, said wheels having teeth on their faces arranged to engage the teeth of the clutch-sleeve, gear-wheels of different diameters, one secured to one end of the intermediate shaft and the other secured to the opposite end of the intermediate shaft between the bevel-wheels and the bearings, a driven shaft having a central squared portion, a long sleeve mounted on the squared portion having teeth at each end, gear-wheels loosely mounted on the cylindrical portions of the said shaft on each side of the squared portion, said wheels differing in diameter so as to mesh with the wheels on the intermediate shaft, and means for shifting the two sleeves, said driven shaft extending beyond the bearings on each side, and sprocket-wheels mounted on the extensions of the shaft, substantially as described.

3. The combination in a change-gear, of a frame, a driving-shaft mounted in bearings in the frame, a bevel-pinion thereon, an intermediate shaft, ball-bearings on the frame for the said intermediate shaft, a clutch-sleeve mounted on the central portion of the said shaft so as to turn with but slide upon the shaft, two bevel-wheels loose on the shaft and meshing with the driving-pinion, two gear-wheels one on each end of the shaft between the bearing-boxes and the hubs of the bevel-wheels, said gear-wheels being of different diameter and having extended hubs, thrust-bearings mounted on the extended hubs of the said gear-wheels, each of said bearings consisting of two rings and a series of balls between them, a driven shaft, gear-wheels on the shaft meshing with the gear-wheels on the intermediate shaft, and means for locking one or other of the gear-wheels to the driven shaft, substantially as described.

In testimony whereof I have signed my name to this specification in the presence of two subscribing witnesses.

ARCHIBALD HYDE EHLE.

Witnesses:
 WILL A. BARR,
 E. R. LOUGHERY.